United States Patent
Kuphal

(10) Patent No.: US 9,265,243 B2
(45) Date of Patent: Feb. 23, 2016

(54) BI-DIRECTIONAL BREAK-AWAY BOOM WITH TORSION SPRINGS AND ROTARY DAMPER

(71) Applicant: AGCO Corporation, Hesston, KS (US)

(72) Inventor: John Kuphal, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/509,475

(22) Filed: Oct. 8, 2014

(65) Prior Publication Data

US 2015/0098752 A1    Apr. 9, 2015

Related U.S. Application Data

(60) Provisional application No. 61/888,145, filed on Oct. 8, 2013.

(51) Int. Cl.
| | | |
|---|---|---|
| *A01C 7/08* | (2006.01) | |
| *A01M 7/00* | (2006.01) | |
| *A01C 23/00* | (2006.01) | |

(52) U.S. Cl.
CPC .............. *A01M 7/0078* (2013.01); *A01C 7/08* (2013.01); *A01C 23/008* (2013.01); *Y10T 403/32254* (2015.01)

(58) Field of Classification Search
None
See application file for complete search history.

(56) References Cited

U.S. PATENT DOCUMENTS

| | | | | |
|---|---|---|---|---|
| 4,539,727 A * | 9/1985 | Mautner | ............... | E05F 1/1215 16/277 |
| 4,834,249 A * | 5/1989 | Dahl | ................... | A01M 7/0078 212/258 |
| 7,823,803 B2 * | 11/2010 | Peterson | .............. | A01C 23/008 239/159 |
| 2012/0237284 A1* | 9/2012 | Bouten | ............... | A01M 7/0078 403/111 |
| 2013/0205543 A1* | 8/2013 | Chen | ...................... | E05F 1/1215 16/301 |

* cited by examiner

*Primary Examiner* — Daniel P Stodola
*Assistant Examiner* — Matthieu Setliff

(57) ABSTRACT

A break-away apparatus for a boom arm is positioned at a joint between the main boom portion and the boom tip. The apparatus allows the boom tip to assume a neutral position and to pivot forward and rearward. The apparatus includes a first plate disposed at the joint, a second plate disposed at the joint, and a hinge assembly positioned between the first plate and the second plate. The hinge assembly includes a hinge pin having a longitudinal axis. The first and second plates are in a first position with respect to each other when the boom tip assumes the neutral position. The first and second plates are movable with respect to each other about the longitudinal axis. A torsion spring is configured to return the first and second plates to the first position after the first and second plates move from the first position.

6 Claims, 4 Drawing Sheets

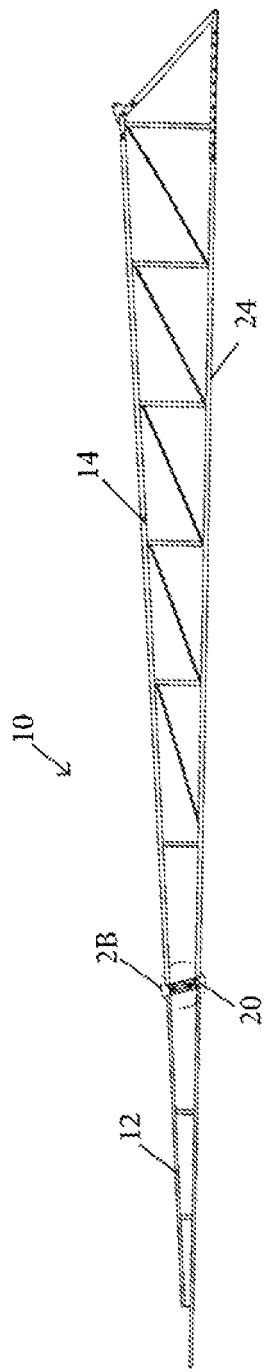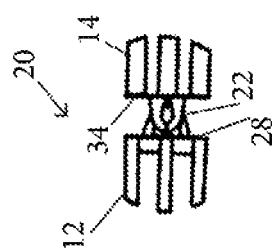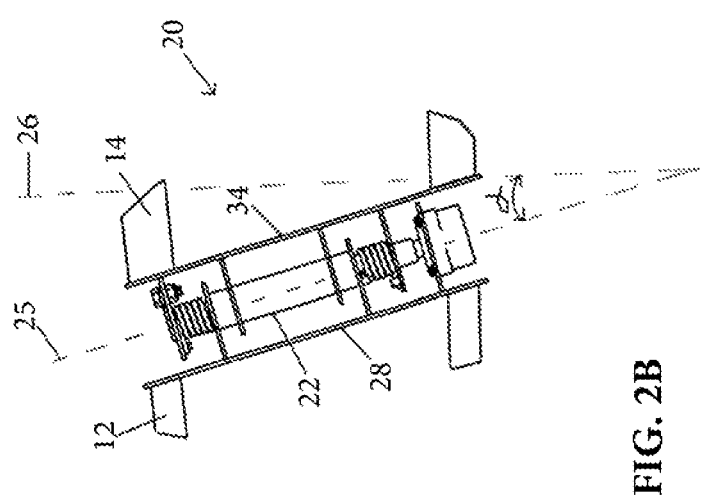
FIG. 2A
FIG. 2C
FIG. 2B

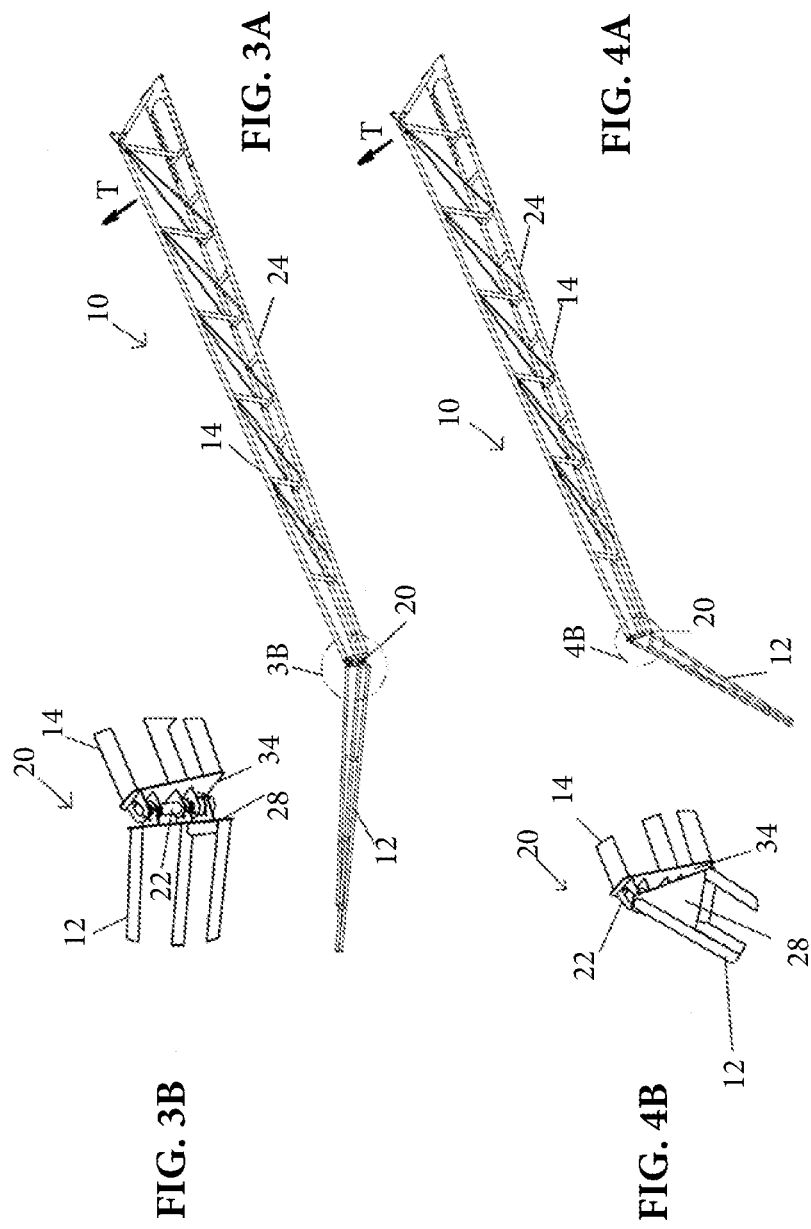

BI-DIRECTIONAL BREAK-AWAY BOOM WITH TORSION SPRINGS AND ROTARY DAMPER

CROSS REFERENCE TO RELATED APPLICATION

This application claims priority to U.S. Provisional Application No. 61/888,145, filed Oct. 8, 2013, entitled "BI-DIRECTIONAL BREAK-AWAY BOOM WITH TORSION SPRINGS AND ROTARY DAMPER" which is hereby incorporated by reference in its entirety.

BACKGROUND OF THE INVENTION

1. Field of Invention

This invention relates generally to agricultural sprayers, and more particularly to a break-away boom arm for an agricultural sprayer.

2. Description of Related Art

A crop sprayer may be in the form of an agricultural vehicle or may be mounted to an agricultural vehicle. The crop sprayer may spray a fluid including herbicides, pesticides, and fertilizers on agricultural crops in a field. The fluid may be sprayed from nozzles mounted on a boom on the crop sprayer. Large agricultural sprayers typically have horizontal booms to allow for extensive spray coverage of crops in a field with a single travel pass. In some cases, booms have a length between about 20 and about 150 feet.

With conventional crop sprayers, an operator may drive the crop sprayer forward in a field. As the crop sprayer moves in the field, the boom (or more specifically, a boom tip) may impact an obstacle (such as a tree, power pole, fence or post, for example), or force may otherwise be applied to the boom. This impact or force may damage the boom, the boom tip and/or the obstacle.

In some commercially produced chemical application booms, the boom tips are configured to break away rearwardly as the sprayer moves forward. However, in some cases, such as when the sprayer travels backward, the boom encounters an obstacle wherein it is pushed forwardly. Many boom tips are not designed to break away forwardly; thus, the boom may sustain extensive damage.

SUMMARY

In one aspect, a break-away apparatus for a boom arm comprising a main boom portion and a boom tip is disclosed. The apparatus is positioned at a joint between the main boom portion and the boom tip. The apparatus allows the boom tip to assume a neutral position and to pivot to a forward position and to a rearward position with respect to the main boom portion. The apparatus comprises a first plate disposed at the joint, a second plate disposed at the joint, and a hinge assembly positioned between the first plate and the second plate. The hinge assembly comprises a hinge pin having a longitudinal axis. The first and second plates are in a first position with respect to each other when the boom tip assumes the neutral position. The first and second plates are movable with respect to each other about the longitudinal axis. A torsion spring is configured to return the first and second plates to the first position after the first and second plates move from the first position.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 2A is a side elevation view of the exemplary boom.

FIG. 2B is an enlarged view of the circle 2B in FIG. 2A.

FIG. 2C is a top plan view of the area of the circle 2B in FIG. 2A.

FIG. 3A is a top perspective view of the exemplary boom in a forward break configuration, as if mounted on an implement traveling in direction T.

FIG. 3B is an enlarged view of the circle 3B of FIG. 3A.

FIG. 4A is a top perspective view of the exemplary boom in a rearward break configuration, as if mounted on an implement traveling in direction T.

FIG. 4B is an enlarged view of the circle 4B of FIG. 4A.

Figure 1A:
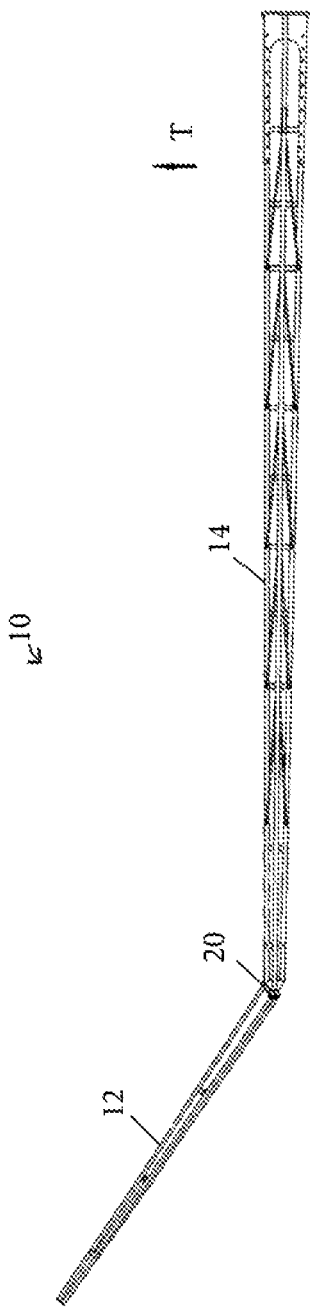
FIG. 1A is a top plan view of an exemplary boom arm in a forward break configuration, as if mounted on an implement traveling in direction T.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

A break-away assembly of the present disclosure allows a boom tip to break away to the rear or front of the agricultural vehicle without damaging the agricultural vehicle or the boom arm when the boom tip impacts an obstacle or when a sufficient force is otherwise be applied to the boom tip. Release of the boom tip diminishes the stress placed on the boom arm and mounting apparatus.

A boom arm with a bi-directional boom-tip break-away feature is described that can be used, for example, on liquid sprayers. A suitable liquid sprayer is disclosed in U.S. Patent Application Publication No. 2012/0237284, assigned to AGCO Corporation, and entitled "Boom fore and aft break-away assembly," the disclosure of which is fully incorporated by reference herein. Another suitable liquid sprayer is disclosed in U.S. Pat. No. 7,823,803, assigned to AGCO Corporation, and entitled "Integrated breakaway cylinder and method for constructing a boom assembly," the disclosure of which is fully incorporated by reference herein. A boom arm of the present disclosure may be attached to a liquid sprayer by conventional means.

An exemplary break-away boom arm of the present disclosure allows the boom tip to hinge back or forward when coming in contact with an obstruction in the field. In one embodiment, the boom tip is connected to the main boom portion by a hinge assembly having torsion springs concentric with a hinge pin. The torsion springs bring the boom tip back to center from either forward or rearward movement. A rotary damper is used in an embodiment to control the speed at which the boom tip comes back into the neutral position.

Figure 1B:
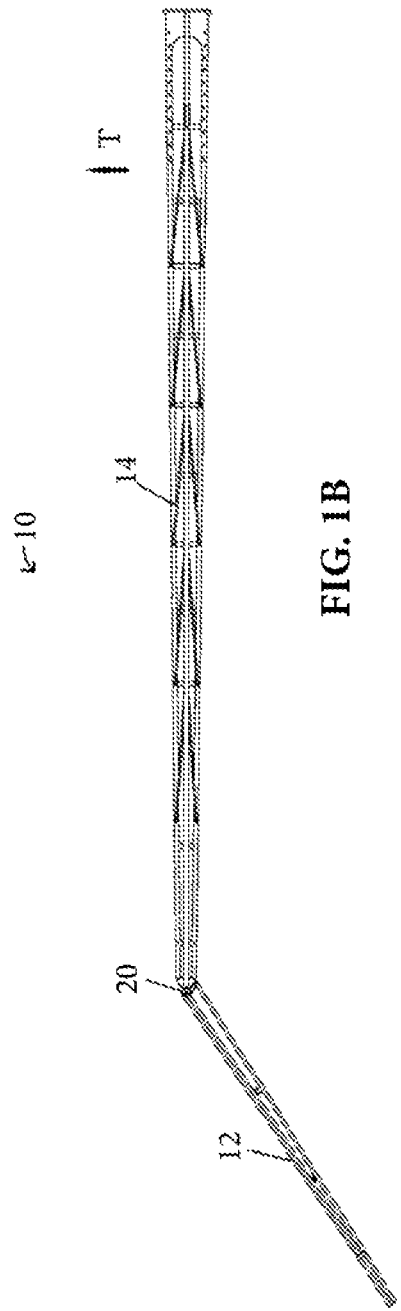
FIG. 1B is a top plan view of the exemplary boom arm in a rearward break configuration, as if mounted on an implement traveling in direction T.

FIG. 1A is a top plan view of an exemplary boom arm 10 in a forward break configuration, with boom tip 12 pivoted forward from main boom portion 14. In an exemplary embodiment, boom arm 10 is a truss assembly of aluminum pieces; boom arm 10 supports a plurality of liquid spray nozzles (not shown). FIG. 1B is a top plan view of boom arm 10 in a rearward break configuration, with boom tip 12 pivoted rearward from main boom portion 14. The structure and operation of the break-away mechanism or apparatus 20 positioned at a joint between main boom portion 14 and boom tip 12 is further described below.

FIG. 2A is a side elevation view of horizontally extending boom arm 10 in a neutral position (i.e., with boom tip 12 not pivoted forward or backward). FIG. 2B is an enlarged view of the circled area 2B in FIG. 2A, showing hinge assembly 22 of break-away mechanism 20. FIG. 2C is a top plan view of the circled area 2B in FIG. 2A. In an exemplary embodiment, hinge assembly 22 is not normal or perpendicular with respect to the bottom surface 24 of boom arm 10 (which, when its associated sprayer is disposed on a horizontal surface, is also generally horizontal). Rather, hinge axis 25 of hinge assembly 22 is disposed at an acute angle alpha with respect to a line 26 that is perpendicular to generally horizontally extending bottom surface 24 of boom arm 10. In an exemplary embodiment, alpha is between about 10 degrees and about 20 degrees, and is most suitably about 15 degrees. Because of this inclination, boom tip 12 becomes aligned slightly upward as well as forward (as shown in FIG. 1A) or rearward (as shown in FIG. 1B) relative to main boom portion 14 when pivoted on axis 25. When the obstacle that caused the forward or rearward pivoting of boom tip 12 relative to main boom portion 14 is passed, gravity assists in returning boom tip 12 to the neutral position shown in FIG. 2A. Other angles outside of the 10-20 degree range may be used, but smaller angles will not offer as much gravity assistance for the boom tip return to its unpivoted position, and larger angles will result in additional stresses on hinge assembly 22.

FIG. 3A is a top perspective view of boom arm 10 in a forward break configuration, the top plan view of which is shown in FIG. 1A. FIG. 3B is an enlarged view of circled area 3B in FIG. 3A. FIG. 4A is a top perspective view of boom arm 10 in a rearward break configuration, the top plan view of which is shown in FIG. 1B. FIG. 4B is an enlarged view of circled area 4B in FIG. 4A. In an exemplary embodiment, boom tip 12 includes end plate 28, and main boom portion 14 includes end plate 34. Hinge assembly 22 is positioned between end plates 28 and 34. While the term "plate" is used, it is to be understood that plates 28 and 24 need not be flat. On one side of the joint between main boom portion 14 and boom tip 12, end plate 28 is disposed at an end of boom tip 12. On the other side of the joint between main boom portion 14 and boom tip 12, end plate 34 is disposed at an end of main boom portion 14.

Figure 5B:
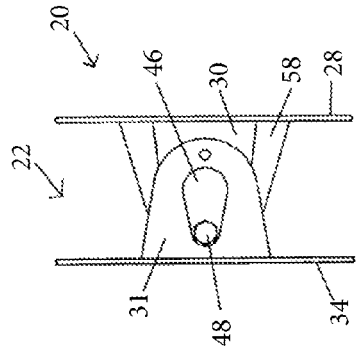
FIG. 5B is a top plan view of the joint of FIG. 5A.
Figure 5C:
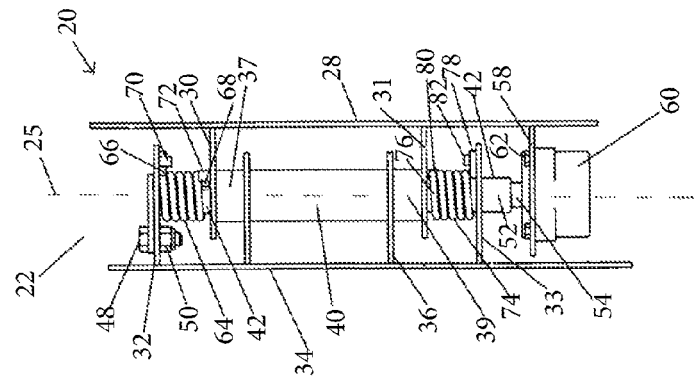
FIG. 5C is a side elevation view of the joint of FIG. 5B.
Figure 5A:
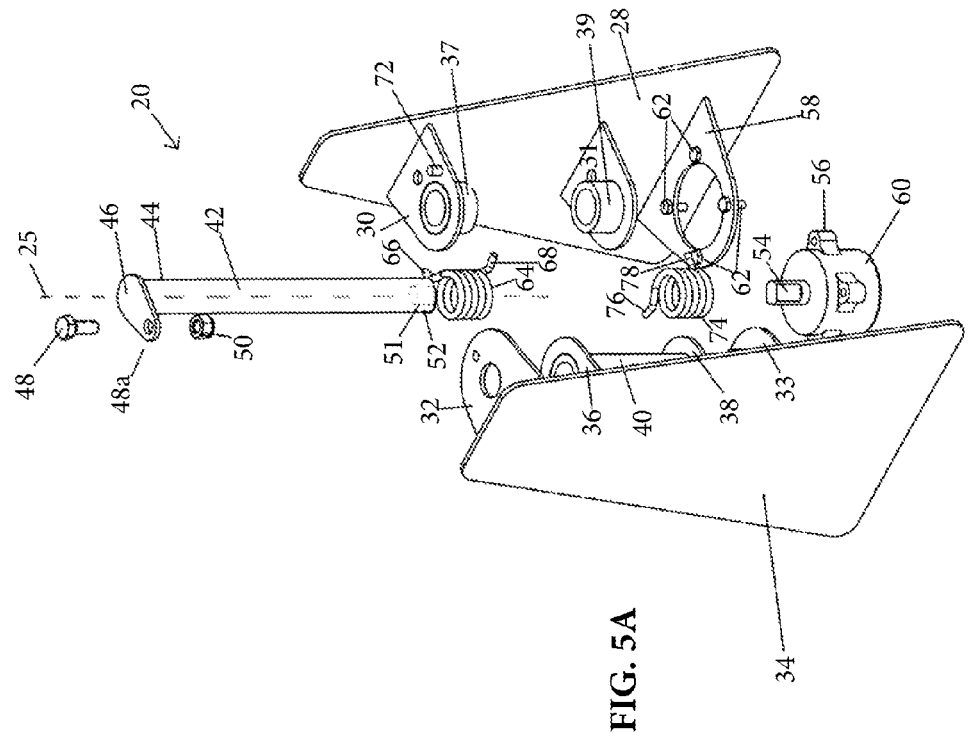
FIG. 5A is an exploded perspective view of an exemplary breakaway joint in the boom of FIGS. 1A-4B.

FIGS. 5A-5C show exploded, top plan and side elevations views, respectively, of break-away mechanism 20. Please note that the orientation of FIGS. 5A-5C is opposite that of FIGS. 1A-4B. In particular, in FIGS. 5A-5C, end plate 34 of main boom portion 14 is shown on the left, and end plate 28 of boom tip 12 is shown on the right. Upper and lower pin holding brackets 30 and 31, respectively, extend from end plate 28; upper and lower pin holding brackets 32 and 33, respectively, extend from end plate 34. Upper pin holding bracket 30 includes upper pin sleeve 37, and lower pin holding bracket 31 includes lower pin sleeve 39. Central brackets 36 and 38 extend from end plate 34 and fixedly support central pin sleeve 40. When assembled as seen in FIG. 5C, upper pin sleeve 37, central pin sleeve 40 and lower pin sleeve 39 define hinge axis 25 and support hinge pin 42. In an exemplary embodiment, top end 44 of hinge pin 42 includes a plate 46 that is secured to upper pin holding bracket 32 (with, for example, bolt 48, nut 50, and cooperative apertures 48a and 48b (not shown) on plate 46 and bracket 32, respectively, though other fastening arrangements can also or alternatively be used). Thus, hinge pin 42 is fixed to end plate 34. Pin sleeves 37, 39 are dimensioned to allow pin sleeves 37, 39 to rotate around hinge pin 42 about hinge axis 25.

Rotary damper 56 limits free rotation of pin sleeves 37, 39 relative to hinge pin 42. Housing 60 of rotary damper 56 is fixed to bracket 58 of end plate 28 of boom tip 12 (with, for example, screws 62, though other fasteners can also or alternatively be used). Stud 54 of rotary damper 56 has a contour that fits closely within a complimentary bore 51 (see FIG. 5A) in a lower end 52 of hinge pin 42. As boom tip 12 (and therefore end plate 28) moves with respect to main boom portion 14, housing 60 moves with boom tip 12. However, stud 54 of rotary damper 56 is fixed to hinge pin 42, which in turn is fixed to end plate 34 of main boom portion 14. Rotary damper 56 is configured to control the rate at which housing 60 and stud 54 return to the neutral position (i.e., where boom tip 12 is unpivoted relative to main boom portion 14). Rotary damper 56 thereby controls the rate at which the attached boom tip 12 and main boom portion 14 return to the neutral configuration (i.e., unpivoted relative to each other). Known rotary dampers may be used, including, for example, model X-CRD, commercially available from Kinetrol LTD of Tulsa, Okla.

When break-away mechanism 20 is assembled as shown in FIG. 5C, upper torsion spring 64 concentrically surrounds hinge pin 42 and is positioned between upper pin holding bracket 32 of plate 34 and upper pin holding bracket 30 of plate 28. Upper torsion spring 64 includes upper end 66 and lower end 68. Upper end 66 is held in place by peg 70 on a bottom surface of pin holding bracket 32. Lower end 68 is held in place by peg 72 on a top surface of pin holding bracket 30. Lower torsion spring 74 concentrically surrounds hinge pin 42 and is positioned between lower pin holding bracket 33 of plate 34 and lower pin holding bracket 31 of plate 28. Lower torsion spring 74 includes upper end 76 and lower end 78. Upper end 76 is held in place by peg 80 on a bottom surface of pin holding bracket 31. Lower end 78 is held in place by peg 82 on a top surface of pin holding bracket 33.

In an exemplary embodiment, each of torsion springs 64, 74 is a helical coil spring that is positioned coaxially with hinge pin 42 so that an axis of the coil coincides with hinge axis 25. Torsion springs 64, 74 are arranged with respect to end plates 28, 34 so that movement of the plates 28, 34 about hinge axis 25 in one direction (such as with a forward break shown in FIG. 3B or a rearward break shown in FIG. 4B) will twist the coil of one of the torsion springs 64, 74 tighter; movement of the plates 28, 34 about hinge axis 25 in the opposite direction will twist the coil of the other torsion spring 64, 74 tighter.

Keeping in mind that the orientation of FIGS. 5A-5C is opposite the orientation of FIGS. 1A-4B, it is evident that a forward break such as shown in FIG. 3B causes upper torsion spring 64 to twist more tightly, thereby increasing the bending moments in the coil of upper torsion spring 64. The recovery force of upper torsion spring 64 thus urges ends plates 28, 34 back into the neutral position shown in FIG. 5C. Similarly, a rearward break such as shown in FIG. 4B causes lower torsion spring 74 to twist more tightly, thereby increasing the bending moments in the coil of lower torsion spring 74. The recovery force of lower torsion spring 74 thus urges ends plates 28, 34 back into the neutral position shown in FIG. 5C. In another embodiment, the arrangement of upper and lower torsion springs 64, 74 may be changed so that recovery from a forward break is achieved by lower torsion spring 74 and recovery from rearward break is achieved by upper torsion spring 64.

Although the subject of this disclosure has been described with reference to several embodiments, workers skilled in the art will recognize that changes may be made in form and detail without departing from the spirit and scope of the disclosure. While a particular configuration of break-away mechanism 20 is described, it is contemplated that variations may be made. For example, while a particular arrangement of elements is shown, it is contemplated that parts of a break-away mechanism may be assembled otherwise. For example, while the illustrated embodiment shows a structure in which certain elements are attached to main boom portion 14 and other elements are attached to boom tip 12, it is contemplated that these attachments may be reversed.

What is claimed is:

1. A boom arm with a bi-directional break-away apparatus, the boom arm comprising a main boom portion and a boom tip, the break-away apparatus being positioned at a joint between the main boom portion and the boom tip, the break-away apparatus allowing the boom tip to assume a neutral position and to pivot to a forward position and to a rearward position with respect to the main boom portion, the break-away apparatus comprising:
    a first plate disposed at the joint, the first plate is attached to the main boom portion;
    a second plate disposed at the joint, the second plate is attached to the boom tip;
    a hinge assembly positioned between the first plate and the second plate, the hinge assembly comprising a hinge pin having a longitudinal axis, wherein the hinge pin is rotationally fixed to the first plate so that the hinge pin is prevented from rotating relative the first plate;
    wherein the first and second plates are in a first position with respect to each other when the boom tip assumes the neutral position, and wherein the first and second plates are movable with respect to each other about the longitudinal axis to pivot the boom tip to a forward position and to a rearward position;
    a pair of torsion springs configured to return the first and second plates to the first position after the first and second plates move from the first position, wherein the first torsion spring is configured to return the first and second plates to the first position after the boom tip pivots to a forward position, and wherein the second torsion spring is configured to return the first and second plates to the first position after the boom tip pivots to a rearward position; and
    a rotary damper that controls return of the first and second plates to the first position from the forward and rearward positions, wherein a housing of the rotary damper is attached to the second plate, and wherein a stud of the rotary damper is fixed to the hinge pin so that the hinge pin is prevented from rotating relative the stud.

2. The boom arm of claim 1 further comprising a pin sleeve that at least partially surrounds the hinge pin and is rotatable around the hinge pin about the longitudinal axis.

3. The boom arm of claim 1 wherein the hinge assembly is tilted at an acute angle to a direction that is perpendicular to a bottom surface of the boom arm.

4. The boom arm of claim 1 wherein the boom tip pivots upwardly when it pivots forward or rearward.

5. The boom arm of claim 1 wherein each of the first and second torsion springs is a helical coil spring positioned coaxially around the hinge pin.

6. The boom arm of claim 5 wherein each of the first and second torsion springs has first and second ends, and wherein each first end is configured to move with the first plate, and wherein each second end is configured to move with the second plate.

* * * * *